358-86. OR 2,607,846 SR

SEARCH ROO

Aug. 19, 1952

M. M. HUBBARD

MULTIPLE ENERGIZATION CIRCUIT FOR SUBSCRIPTION TELEVISION

Filed May 6, 1949

2,607,846

MALCOLM M. HUBBARD
*INVENTOR.*

BY [signature]
HIS AGENT

SEARCH ROOM

Patented Aug. 19, 1952 2,607,846

UNITED STATES PATENT OFFICE 2,607,846

MULTIPLE ENERGIZATION CIRCUIT FOR SUBSCRIPTION TELEVISION

Malcolm M. Hubbard, Marblehead, Mass., assignor to Zenith Radio Corporation, a corporation of Illinois Application May 6, 1949, Serial No. 91,810

8 Claims. (Cl. 178—6)

Figures 1, 2:
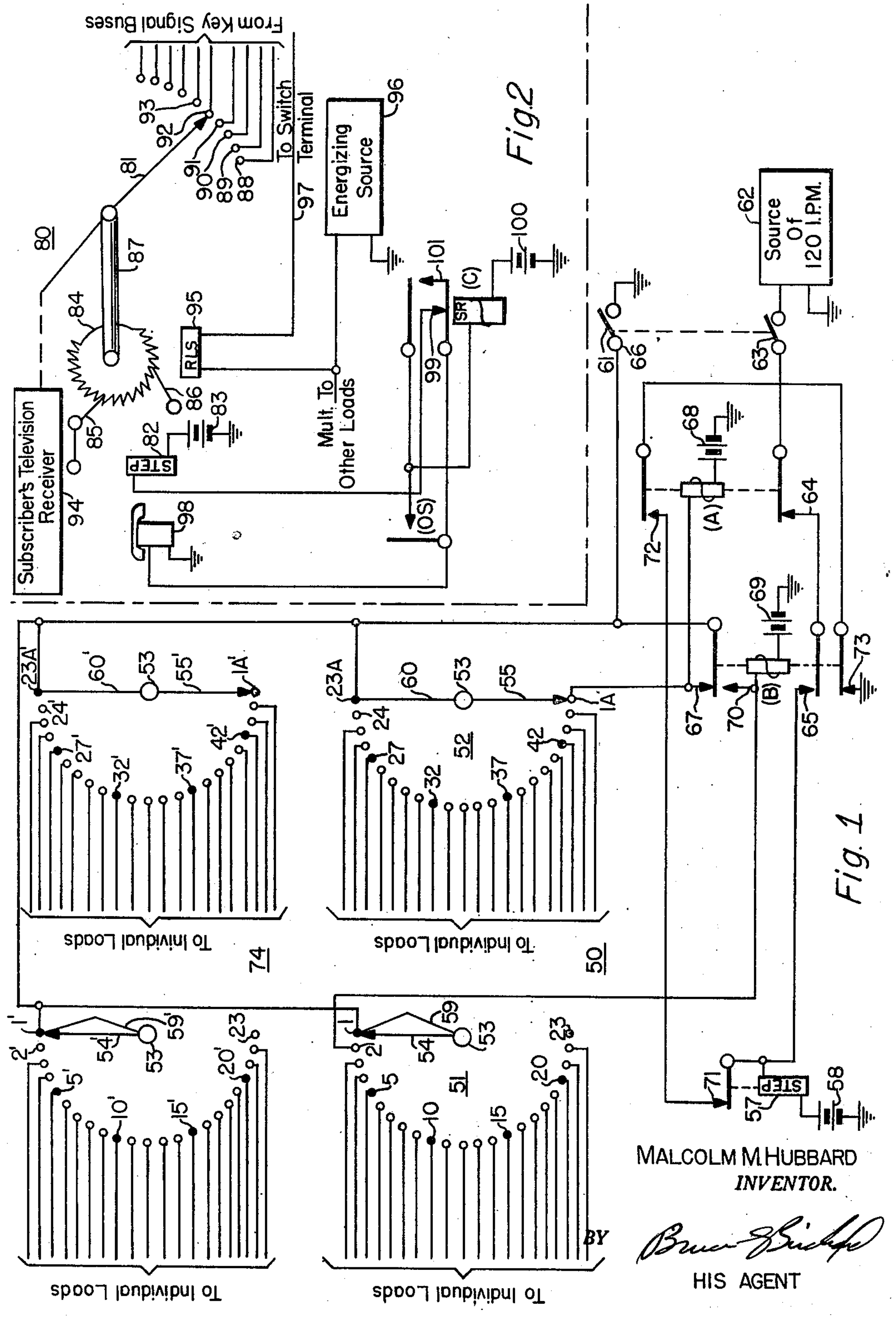

This invention relates to control apparatus, and more particularly to apparatus for initiating energization of a plurality of loads by a single operation at a central station.

The copending applications of Alexander Ellett et al., Serial No. 742,374, filed April 18, 1947, for Radio Wire Signalling System, now U. S. Patent 2,510,046, issued May 30, 1950, and of Erwin M. Roschke, Serial No. 773,848, filed September 13, 1947, for Subscription, Image Transmission System and Apparatus, now U. S. Patent 2,547,598, issued April 3, 1951, both of which are assigned to the same assignee as the present application, disclose certain novel subscription television systems in which the radiated composite television signal is coded in accordance with an arbitrary code schedule, and in which an ancillary key signal representing such code schedule is transmitted to an authorized subscriber over a wire-line conductor. The commercial adaptation of such systems requires that the key signal supplied to each subscriber be metered, so that an appropriate charge may be made for the service. Consequently, it is contemplated that apparatus individual to each subscriber be provided at a central station to route the requested key signal to the subscriber and to make an appropriate record so that suitable billing may be subsequently made. For example, a stepping switch energizable by the dial mechanism of the subscriber's dial telephone hand-set may be provided so that the subscriber may choose the desired key signal by dialing the appropriate channel number, and a recording device may be operated from the shaft of the same stepping switch.

With such an arrangement, it is desirable that at the end of any given program interval, the stepping switches associated with all subscribers may be restored to normal by a single operation at the central station, in order to break the connection between the key signal supply bus and the subscriber's wire-line conductors. Furthermore, it is desirable to provide an arrangement whereby any individual subscriber may, on a moment's notice, restore the stepping switch individual to him to a normal position in the event that he desires to receive a program on a different channel or in the event that he no longer wishes to receive the key signal to which he is connected.

Thus, in these and similar applications, it is desirable to provide apparatus for collectively energizing a plurality of similar loads by a single operation at a central station and alternatively for individually energizing such loads from respective remote control stations.

For economic reasons, it is advantageous to use a common energizing-current source for effecting the energization of the loads from the central station. However, energization of all loads simultaneously results in an excessive drain on the energizing-current source. Such excessive current drain may be avoided if apparatus is provided for collectively energizing the loads in time sequence rather than simultaneously.

It is, therefore, an important object of the present invention to provide apparatus for sequentially energizing a plurality of similar loads by a single operation from a central station, and alternatively for individually energizing such loads from respective remote control stations.

It is a further object of the invention to provide apparatus for sequentially energizing from a central station a plurality of similar loads from a common energizing-current source, thereby to avoid excessive current drain from such source.

Still another object of the invention is to provide apparatus for sequentially energizing a plurality of similar loads from a central station and alternatively for individually and selectively energizing such loads from respective remote control stations.

Yet another important object of the invention is to provide an improved control circuit for use in effecting sequential energization of a plurality of similar loads by a single operation from a central station.

Still another object of the present invention is to provide apparatus for restoring a plurality of stepping switch devices to a normal or inoperative position either sequentially from a central station or individually and selectively from respective remote control stations.

In accordance with one feature of the present invention, the above-mentioned objects are attained by providing at the central station a switch device having a plurality of contact terminals and a movable contactor which is responsive to a repetitive electrical signal to make electrical contact individually and sequentially with the contact terminals. Circuit means are provided connecting individual ones of the loads with individual ones of the terminals, and the loads are multiple-connected to a common energizing-current source. Also provided at the central station is a normally open control circuit including the movable contactor and having circuit-closing means at the central station for applying the repetitive signal to the switch device to energize the loads momentarily and in time sequence. A manually operable pulsing device is provided at each of the remote control stations and is individually coupled to a respective one of the loads. In this manner, the loads are placed under the collective control of the central station and alternatively under the individual control of the respective remote control stations.

The features of the present invention which are believed to be novel are set forth with particularity in the appended claims. The invention, together with further objects and advantages thereof, may best be understood, however, by reference to the following description taken in connection with the accompanying drawing, in which:

Figure 1 is a schematic representation of control apparatus constructed in accordance with the present invention, and Figure 2 is a schematic representation of a single representative load and its associated circuit connections.

In Figure 1, a stepping switch device indicated generally by the reference numeral 50 comprises a pair of banks 51 and 52 of contact terminals and a movable contactor fixed to a shaft 53 and having a pair of contacting portions 54 and 55 arranged in operative relationship with respect to contact terminal banks 51 and 52 respectively. Portions 54 and 55 of the movable contactor are arranged to contact respective terminal banks 51 and 52 successively in a manner well known in the art; in other words, when portion 54 of the movable contactor engages the terminals of bank 51, portion 55 of the movable contactor is not in operative engagement with any contact terminals, and vice versa. The contact terminals are numbered from 1 to 44 in the order in which they are engaged by portions 54 and 55 of the movable contactor upon operation of the stepping switch device 50. As shown, portions 54 and 55 and the movable contactor are disposed in a normal position with portion 54 in conductive engagement with terminal 1 and portion 55 in conductive engagement with terminal 1A. At the time when portion 54 of the movable contactor has stepped around into a conductive engagement with terminal 23, by counterclockwise rotation of shaft 53, portion 55 of the movable contactor enters engagement with the terminal 23A of the terminal bank 52. It is contemplated that portions 54 and 55 may be physically separate contactors, and where reference is made to a movable contactor, it is to be understood that such a construction may be used.

Stepping switch device 50 also comprises a stepping solenoid 57 which is connected to ground through an energizing source 58 and which is arranged to step movable contactor portions 54 and 55 successively from one terminal to the next in a manner well known in the art.

The feeder brushes 59 and 60 connected to movable contactor portions 54 and 55 are connected respectively to terminals 1 and 23A and thence through a switch 61 to ground. A source 62 of a repetitive electrical signal is connected to stepping solenoid 57 through a second switch 63, a normally closed contact 64 of a first relay A, and a normally open contact 65 of a second relay B. Source 62 may comprise, for example, a grounded interrupter arranged to impress intermittent grounds on switch 63 at a rate of 120 pulses per minute. To facilitate the explanation reference will be made to the transmission of "ground pulses" through specified circuits, and by this terminology is meant the completion of energization circuits through momentary ground connections. Switches 61 and 63 may be ganged for unicontrol operation.

The ungrounded terminal 66 of switch 61 is connected to terminal 1A of switch device 50 through a normally closed contact 67 associated with relay B, and is connected to ground through the energizing coil of relay A and a relay energizing battery 68.

Terminal 2 of switch device 50 is connected to ground through the energizing coil of relay B and through a relay energizing battery 69, and the energizing coil of relay B is also connected to the ungrounded terminal 66 of switch 61 through a normally open contact 70 associated with that relay.

Stepping solenoid 57 is connected to ground through a normally closed contact 71 associated with the stepping solenoid, a normally open contact 72 of relay A, and a normally closed contact 73 associated with relay B.

Individual outgoing leads are connected to each of contact terminals 3—22 and 25—44 and each of these leads is connected to an individual load to be energized; for example, a typical load may comprise an arrangement as shown schematically in Figure 2.

In order to increase the traffic capabilities of the circuit of Figure 1, a second array 74 of contact terminals may be arranged for actuation by stepping solenoid 57. The movable contactor portions 54' and 55' of the second array are fixed to the same shaft 53 as are portions 54 and 55 associated with terminal banks 51 and 52. The contact terminals of the second array are numbered similarly to those of the first, these numerals being primed to distinguish them from the corresponding terminals of the first array. Similarly, other arrays may be multipled if desired.

Figure 2 is a schematic representation of a single typical load; similar loads may be connected to each of the outgoing leads from terminals 3—22, 25—44, 3'—22', and 25'—44'. The arrangement shown in Figure 2 is one which is particularly adapted for use in distributing the key signal to authorized subscribers in connection with a subscription type television service as outlined above. With such a service, a coded composite television signal is placed on the air by a subscription type television transmitter (not shown), and a key signal indicating the coding schedule is transmitted by wire line to a central station for distribution to authorized subscribers. The apparatus shown schematically in Figure 2 is designed to accomplish automatic distribution of the desired key signal to individual subscribers.

The apparatus of Figure 2 comprises a ten-point minor switch 80 or other similar stepping switch device wherein a movable contactor 81 is caused to make electrical contact with a selected contact terminal in accordance with the number of ground pulses impressed on a stepping solenoid 82, the latter being connected to ground through an energizing battery 83. In the normal or unactuated position, contactor 81 does not engage any contact terminal. The mechanism for accomplishing the desired movement of contactor 81 comprises a spring-biased ratchet wheel 84 having a plurality of teeth. A pawl 85, operated by stepping solenoid 82, is adapted to engage the teeth of the ratchet wheel 84, and a detent 86 operates as a catch mechanism to lock the ratchet wheel in any operated position. Ratchet wheel 84 drives movable contactor 81 by virtue of the

SEARCH ROOM fact that wheel 84 and contactor 81 are mounted on a common shaft 87.

Individual contact terminals 88—93 are connected to separate key signal busses (not shown) at the central station; each of the key signal busses may carry the appropriate key signal for the program being transmitted over a separate television channel. Movable contactor 81 is coupled to a subscriber's television receiver 94, as shown and described in the aforementioned copending applications.

Also included in switch device 80 is a release solenoid 95 which is operatively associated with detent 86 and which is coupled to ground through an energizing-current source 96. Release solenoid 95 is connected through a wire conductor 97 to the outgoing lead from one of the contact terminals of switch device 50 of Figure 1; for example, conductor 97 may be connected to the outgoing lead associated with terminal 10 of Figure 1. It is understood that the contemplated system comprises a plurality of switch devices 80, one for each subscriber, and the release solenoid of each individual subscriber's switch device is connected to an individual outgoing lead associated with one of the contact terminals of switch device 50 of Figure 1. Energizing source 96 may comprise a battery or rectifier device and is multiple-connected to the release solenoids of all switch devices 80.

Minor switch 80 is also arranged in a manner well known in the art to release to a normal or inoperative position on overstepping, and an over-step spring contact OS is provided, this contact being closed whenever device 80 over-steps.

Stepping solenoid 82 is connected to the subscriber's telephone hand-set 98 through a normally closed contact 99 of a quick energizing-slow release relay C. The energizing coil of relay C is connected to ground through an energizing battery 100 and to the telephone hand-set 98 through the normally open over-step springs OS. The energizing coil of relay C is also connected to hand-set 98 through a normally open contact 101 associated with that relay. Contacts 101 and 99 of relay C are constructed in a well known make-before-break arrangement; that is, upon energization of relay C, contact 101 closes before contact 99 opens.

In operation, with reference to Figure 2, when a subscriber desires to condition his television receiver to reproduce an intelligible image from a coded composite television signal received on a given television channel, he places a telephone call to the trunk line of the central station. Completion of this call connects the dial mechanism of his hand-set 98 with the stepping solenoid 82 of a preassigned minor switch 80, as shown in the drawing. The subscriber then dials a number preassigned to the channel for which he desires to receive the key signal. For example, suppose that the subscriber wishes to receive a coded program transmitted on channel V. After completing the call to the central station, the subscriber dials the number 5. This actuates stepping solenoid 82 five times through the path including normally closed contact 99 of relay C, thereby causing movable contactor 81 to step five times and thence into engagement with contact terminal 92 to which has been pre-connected the key signal for channel V. The subscriber's receiver 94 is then conditioned, by transmission of the key signal over the bus from contactor 81, to reproduce an intelligible image. At the same time, apparatus may be provided for recording the subscriber's connection to the key signal for channel V. Such apparatus may comprise a die-cast printing wheel mounted on shaft 87 and a printing solenoid actuated by the central station; the recording apparatus forms no part of the present invention and accordingly is not illustrated.

In accordance with one feature of the present invention, in the event that the subscriber wishes to select a different channel, or if he no longer wishes to receive any key signal, he may restore his minor switch to the normal or unactuated position in which movable contactor 81 is not in engagement with any of the contact terminals. This may be accomplished by the subscriber by dialing "0," thus placing ten pulses on the line to contact 99. If the subscriber is connected to channel V, as illustrated, the first six of these pulses cause switch movable contactor 81 to step six times, thus causing contactor 81 to over-step and restore to normal. At the same time, when contactor 81 over-steps, over-step springs OS close, and relay C is energized. Energization of relay C closes contact 101, thereby completing a self-locking circuit for that relay, and opens contact 99 to remove additional pulses from solenoid 82. The release time of relay C is made greater than the time interval between ground pulses from the subscriber's hand-set dial mechanism, so that contact 101 remains closed and contact 99 remains open until such time as the additional four pulses have passed. In this manner, it is insured that these additional four pulses do not cause contactor 81 to step to one of the contact terminals after having been restored to normal. At a predetermined time after all ten pulses have passed, relay C releases, and contacts 99 and 101 are restored to their normal condition to permit the subscriber to make a subsequent channel selection.

In accordance with another feature of the present invention, the minor switches individually associated with each of the subscribers may be collectively restored to normal by a single operation at the central station. When it is desired to disconnect all subscribers from the key-signal bus to which they are connected, as at the end of a program interval, switches 61 and 63 (Figure 1) are closed by an operator at the central station. Closing of switch 61 completes an energizing circuit for relay A through contact 67, thereby opening contact 64 and closing contact 72. Upon closing contact 72, a ground is applied to stepping solenoid 57 through contact 73 of relay B, operated contact 72 of relay A and contact 71 associated with the stepping solenoid. This ground completes the energizing circuit for solenoid 57 and causes movable contactor portion 54 to step from contact terminal 1 to contact terminal 2; at the same time, movable contact portion 55 breaks contact with terminal 1A.

When contactor portion 54 contacts terminal 2, the energization circuit for relay B is completed through switch 61, feeder brush 59, contactor portion 54, and battery 69 to ground. Operation of relay B opens contact 67, thereby releasing relay A and opening contact 72 to prevent further stepping of device 50. At the same time, contact 70 is closed to complete a holding circuit for relay B through switch 61 and contact 70. Operation of relay B also opens contact 73 and closes contact 65.

When contacts 64 and 65 are closed, repetitive ground pulses from source 62 are applied to the stepping solenoid 57 through switch 63, contact 64 of relay A, and contact 65 of relay B. If source 62 has a frequency of 120 interruptions per minute, stepping solenoid 57 is energized 120 times per minute, and the movable contactors step successively from terminal to terminal, remaining on each terminal for about one-quarter of a second. The appearance of a ground sequentially on each of terminals 3—22 and 25—44 actuates the release solenoid 95 (Figure 2) of the minor switch 80 connected to that terminal, and the release time of device 80 is made less than one-quarter of a second so that energization of release solenoid 95 operates to withdraw detent 86 and allow spring-biased ratchet wheel 84 to return to a normal or inoperative position. In this manner, all subscribers are sequentially disconnected from the key signal busses.

Switch device 50 (Figure 1) steps successively and continuously until such time as contactor portion 55 contacts terminal 1A (i. é., until switch device 50 returns once again to its normal position). At that time, ground is applied through switch 61, feeder brush 60, and contactor portion 55 to energize relay A, thereby opening contact 64 and removing the ground pulses from stepping solenoid 57. Since relay B is still operated, the ground on contact 73 cannot reach stepping solenoid 57 to cause device 50 to step further. The circuit remains in this condition until switches 61 and 63 are opened by the central station operator at some arbitrary time later.

Thus, by the provision of applicant's control circuit incorporating relays A and B and stepping switch device 50, the release solenoids 95 are energized sequentially. Since only one release solenoid is energized at a time, excessive current drain from energizing-current source 96 is precluded.

While the system as shown pertains particularly to the sequential energization of a plurality of release solenoids associated with a number of minor switches, it is contemplated that the circuit may be employed to energize other types of loads. For example, a similar circuit may be employed to energize the printing solenoids associated with each subscriber in order to record the charge for billing purposes, or for "homing" other types of switches utilizing self-interrupting contacts to restore to a normal position.

Thus the present invention provides apparatus for sequentially energizing a plurality of similar loads from a common energizing-current source by a single operation at a central station and alternatively for individually and selectively energizing such loads from respective remote control stations. Collective energization is accomplished while preventing excessive current drain from the energizing current source.

While a particular embodiment of the present invention has been shown and described, it is apparent that various changes and modifications may be made, and it is therefore contemplated in the appended claims to cover all such changes and modifications as fall within the true spirit and scope of the invention.

I claim:

1. In combination: a plurality of similar loads; a source of energizing current; a switch device having a plurality of contact terminals; circuit means connecting individual ones of said loads with individul ones of said terminals; a movable contactor included in said switch device and coupled to said energizing current source for engaging any of said terminals to complete a circuit from said energizing current source to the load connected to the particular terminal engaged by said contactor; a source of a repetitive electrical signal; means included in said switch device and responsive to said repetitive electrical signal for moving said contactor sequentially into momentary engagement with each of said individual terminals; a control circuit located at a first station for removing said repetitive signal from said contactor-moving means after energization of all of said loads; and a plurality of manually operable devices individually located at other stations remote from said first station and individually connected in energization circuits with respective ones of said loads, whereby sequential energization of said loads may be accomplished from said first station and alternatively individual energization of respective ones of said loads may be accomplished from respective ones of said other stations.

2. In combination: a plurality of similar loads adapted to be energized in either of two modes; a source of energizing current; a switch device having a plurality of contact terminals; circuit means connecting individual ones of said loads with individual ones of said terminals; a movable contactor included in said switch device and coupled to said energizing current source for engaging any of said terminals to complete a circuit from said energizing current source to the load connected to the particular terminal engaged by said contactor; a source of a repetitive electrical signal; a stepping solenoid included in said switch device and responsive to said repetitive electrical signal for moving said contactor sequentially into momentary engagement with each of said individual terminals; a control circuit located at a first station for removing said repetitive signal from said stepping solenoid after energization of all of said loads thereby to energize said loads sequentially in one of said modes; and a plurality of manually operable devices individually located at other stations remote from said first station and individually connected in energization circuits with respective ones of said loads to energize said loads individually and selectively in the other of said modes.

3. In combination: a plurality of similar loads; a source of energizing current; a stepping switch device having a plurality of contact terminals; circuit means connecting individual ones of said loads with individual ones of said terminals; a movable contactor included in said switch device and coupled to said energizing current source for engaging any of said terminals to complete a circuit from said energizing current source to the load connected to the particular terminal engaged by said contactor and having a normal position in contact with a first one of said terminals; a source of a repetitive electrical signal; a stepping solenoid included in said switch device and responsive to said repetitive electrical signal for moving said contactor sequentially into momentary engagement with each of said individual terminals; and a control circuit located at a first station and comprising a first circuit including said contactor and said first terminal for momentarily energizing said solenoid to cause said contactor to step from said first terminal to a second one of said terminals, a second circuit including said contactor and said second terminal for applying said repetitive signal to said solenoid to cause said contactor to make successive momentary electrical contact with each of the remainder of said terminals, and a third circuit including said contactor and said

SEARCH ROOM first terminal for removing said repetitive signal from said solenoid upon the return of said contactor to said normal position.

4. Apparatus for sequentially energizing from a central station a plurality of similar loads from a common energizing current source and alternatively for individually and selectively energizing said loads from respective remote control stations, said apparatus comprising: a stepping switch device having a plurality of contact terminals; circuit means connecting individual ones of said loads with individual ones of said terminals; a movable contactor included in said switch device and coupled to said energizing current source for engaging any of said terminals to complete a circuit from said energizing current source to the load connected to the particular terminal engaged by said contactor; a source of a repetitive electrical signal; a stepping solenoid included in said switch device and responsive to said repetitive electrical signal for moving said contactor sequentially into momentary engagement with each of said individual terminals; a normally open control circuit having circuit-closing means at said central station for applying said repetitive signal to said solenoid; and a plurality of manually operable devices individually located at respective ones of said remote control stations and individually connected in energization circuits with respective ones of said loads.

5. Apparatus for sequentially energizing a plurality of similar loads from a common energizing current source, said apparatus comprising: a stepping switch device having a plurality of contact terminals; circuit means connecting individual ones of said loads with individual ones of said terminals; a movable contactor included in said switch device and coupled to said energizing current source for engaging any of said terminals to complete a circuit from said energizing current source to the load connected to the particular terminal engaged by said contactor; a source of a repetitive electrical signal; a stepping solenoid included in said switch device and responsive to said repetitive electrical signal for moving said contactor sequentially into momentary engagement with each of said individual terminals; and a control circuit for removing said repetitive signal from said stepping solenoid after energization of all of said loads.

6. In combination: a stepping switch device having a plurality of operated positions and a normal position and comprising a stepping solenoid and a release solenoid and constructed and arranged to release and return to said normal position on overstepping; and means for restoring said device from any of said operated positions to said normal position from either of two separated stations, said means comprising a manually operable pulsing device coupled to said stepping solenoid and located at one of said stations, and a normally open energizing circuit coupled to said release solenoid and including circuit-closing means located at the other of said stations.

7. In combination: a plurality of stepping switch devices each having a normal position and a plurality of operated positions and each having an associated release solenoid; a source of energizing current multiple-connected to the release solenoids of all of said stepping switch devices; an additional switch device having a plurality of contact terminals; circuit means connecting individual ones of said release solenoids with individual ones of said terminals; a movable contactor included in said additional device and coupled to said energizing current source for engaging any of said terminals to complete an energizing circuit including said energizing current source and the release solenoid connected to the particular terminal engaged by said contactor; a source of a repetitive electrical signal; a stepping solenoid included in said additional device and responsive to said repetitive electrical signal for moving said contactor sequentially into momentary engagement with each of said individual terminals; and an electromechanical control circuit including circuit-closing means for applying said repetitive signal to said stepping solenoid and operative to remove said repetitive signal from said stepping solenoid after energization of all of said release solenoids.

8. In combination: a stepping switch device comprising a stepping solenoid, a plurality of contact terminals, and a movable contactor adapted to make successive electrical contact with said terminals in response to repeated energization of said solenoid and having a normal position in contact with a first one of said terminals; a first circuit including said contactor and said first terminal for momentarily energizing said solenoid to cause said contactor to break contact with said first terminal and to make contact with a second one of said terminals; a source of a repetitive electrical signal; a second circuit including said contactor and said second terminal and operative to couple said source to said solenoid repeatedly to energize said solenoid to cause said contactor to make successive momentary electrical contact with each of the remainder of said terminals; and a third circuit including said contactor and said first terminal and operative to decouple said source from said solenoid upon the return of said contactor to said normal position.

MALCOLM M. HUBBARD.

REFERENCES CITED

The following references are of record in the file of this patent:

UNITED STATES PATENTS

| Number | Name | Date |
|---|---|---|
| 1,387,353 | Clausen | Aug. 9, 1921 |
| 1,554,999 | Gardner | Sept. 9, 1925 |
| 1,569,430 | Lomax | Jan. 12, 1926 |
| 1,626,034 | Gardner | Apr. 26, 1927 |
| 1,667,385 | Jones | Apr. 24, 1928 |
| 2,031,075 | Scheibell | Feb. 18, 1936 |
| 2,095,360 | Green | Oct. 12, 1937 |
| 2,169,389 | Keckler et al. | Aug. 15, 1939 |
| 2,386,263 | Ridings | Oct. 9, 1945 |